United States Patent

[11] 3,602,336

| [72] | Inventor | Ernest W. Downs<br>3081 Bechtel Drive, Franklin, Ohio 45005 |
|---|---|---|
| [21] | Appl. No. | 830,821 |
| [22] | Filed | June 5, 1969 |
| [45] | Patented | Aug. 31, 1971 |

[54] LUBRICANT METERING ASSEMBLY AND VALVES AND PISTON THEREFOR
21 Claims, 9 Drawing Figs.

[52] U.S. Cl. ..................................................... 184/7 D,
137/525, 222/335
[51] Int. Cl. ....................................................F16n 71/40,
F16k 21/04
[50] Field of Search........................................... 184/7, 7 C;
222/249, 250, 335; 137/525, 525.1; 138/31

[56] References Cited
UNITED STATES PATENTS

| 2,300,330 | 10/1942 | Acker | 184/7 |
| 2,584,890 | 2/1952 | Leonard | 184/7 |
| 3,051,263 | 8/1962 | McKenzie | 184/7 |
| 3,121,475 | 2/1964 | McKenzie | 184/7 |
| 3,197,088 | 7/1965 | McKenzie | 222/335 (X) |
| 3,353,712 | 11/1967 | Prescott | 184/7 X |
| 3,500,960 | 3/1970 | Jaggi | 184/7 |

Primary Examiner—Manuel A. Antonakas
Attorney—Watts, Hoffmann, Fisher & Heinke

ABSTRACT: A lubrication system is disclosed wherein lubricant is pumped to lubricated devices through a lubricant metering assembly. The lubricant metering assembly includes valve structures and a piston-cylinder structure in which a piston member and movable valve members are ball bearings having an interference fit with a surrounding rigidly supported plastic sleeve whereby the piston and movable valve members are moved when exposed to unbalanced fluid pressure and yet are tightly sealed against lubricant flow between the movable members and the surrounding sleeve.

PATENTED AUG 31 1971 3,602,336

INVENTOR.
ERNEST W. DOWNS
BY Watts, Hoffmann,
Fisher & Heinke
ATTORNEYS.

3,602,336

LUBRICANT METERING ASSEMBLY AND VALVES AND PISTON THEREFOR

BACKGROUND OF THE INVENTION

1. Field of the Invention

The present invention relates to fluid handling devices employing movable valve members or piston members of a piston-cylinder structure and more particularly relates to lubricant metering assemblies employing such valves or pistons, or both.

2. The Prior Art

Fluid handling systems commonly employ movable valve members or movable piston members, or both, which act on, or are acted upon by fluids in performing their intended functions. In many instances plastic seals surround these movable members and engage adjacent stationary walls to insure against leakage of fluid around the movable member. In such circumstances, it is essential that the stationary wall be provided with an extremely smooth surface so that the seals are not abraded as the members move relative to the wall.

Generally, when fluid pressures are significant the stationary wall must be finished to approximately 15 microinches. This degree of surface finishing requires polishing the walls. Polishing operations require considerable labor and accordingly the price of such fluid handling devices is often extremely high.

The construction of such devices frequently requires that the movable member itself be highly polished and thus additional production costs are incurred.

Lubrication systems are particularly subject to extremely high costs as a result of the finishing operations referred to. Lubrication systems generally have been constructed with metering assemblies for directing measured quantities of lubricant to bearings or other lubricated devices at controlled intervals. Metering assemblies have necessarily included valves and piston-cylinder structures constructed to handle relatively high pressure fluid lubricants.

Because of the high pressures to which the valves and piston-cylinder structures have been subjected, seals for movable valve members and pistons have been forced against the surrounding walls under considerable pressure. Roughness of the surrounding walls has resulted in early failure of many previously proposed metering assemblies. Such failures can result in damage to the lubricated device and downtime of the lubricated device, while repair or replacement of the metering assembly is being effected.

Another problem of the prior art lubricant metering assemblies has resided in the inability of maintenance personnel to determine whether the metering assembly is properly functioning. Generally the metering assemblies are provided with a piston-cylinder structure with a piston effective to move cyclically in its cylinder and thereby force a quantity of lubricant to the lubricated device. Because of the high pressures and low flow rates involved, as well as the viscous nature of many lubricants, the construction of these metering devices has not enabled a quick determination of their operability.

In order to determine whether the piston is moving throughout its stroke and therefore metering the desired quantity of lubricant to the lubricated device, it has been proposed to provide piston position indicating devices. These devices have taken the form of stems attached to the piston and extending through a housing of the metering assembly to the exterior. These stems move with the piston and can be visually monitored to determine whether the piston has cycled. Alternatively, the stems have operated a mechanical counter for this purpose.

The provision of indicating devices of the type referred to has presented substantial sealing problems since the position indicating stem moves reciprocally through a seal between high pressure lubricant and atmospheric air.

SUMMARY OF THE INVENTION

The present invention provides a new and improved lubricant metering assembly which is highly reliable, permits ready visual determination of the position of a lubricant metering piston without the use of stems or the like which move reciprocally through openings in a housing, and which is extremely inexpensively manufactured.

The invention also provides a new and improved valve or piston-cylinder structure including a rigidly supported resiliently deformable sleeve and a movable member in the sleeve comprising at least a ball of the type used in a ball bearing having a larger diametrical extent than the internal diameter of the sleeve so that the ball resiliently compresses the sleeve to form a seal between the sleeve and ball. The ball is movable in the chamber to affect fluid flow.

A lubricant metering assembly constructed in accordance with the present invention communicates with a lubricant pump which alternately supplies pressurized lubricant to separate inlet passageways of the assembly. The metering assembly provides metered flows of lubricant alternately through outlet passageways of the assembly and to lubricated devices.

Pressurized lubricant flowing from the pump into one inlet passageway operates a valve constructed in accordance with the invention to close one outlet passageway of the assembly and to direct the pumped lubricant to a piston-cylinder construction in the assembly.

The pumped lubricant drives the piston thereby forcing lubricant on an opposite side of the piston through the second outlet passageway of the assembly to the lubricated device. The pressure of the lubricant flowing through the second outlet passageway operates a second valve to block lubricant flow from the outlet passageway into the second inlet passageway of the assembly. When the piston reaches its limit of travel a specific amount of lubricant has been dispensed to the lubricated device and one half of the cycle of the metering assembly is completed.

The cycle of the assembly is completed by pumped lubricant flowing into the second inlet passageway to operate the second valve. The second valve blocks the first outlet passageway and directs the pumped lubricant into pressure contact with the piston. The piston is then driven to exhaust the lubricant remaining in the cylinder from the first half cycle through the second outlet passageway to the second lubricated device. The exhaust lubricant operates the first valve to block the first inlet passageway.

Each of the valves is defined by a plastic sleeve and a ball of the type used in a ball bearing disposed within the sleeve. The ball has an external diameter which is larger than the internal diameter of the plastic sleeve. A cylindrical bore surrounds and rigidly supports a portion of the plastic sleeve so that the ball resiliently compresses the plastic material of the sleeve to seal the boundary between the ball and the sleeve within the bore. A portion of the sleeve is unsupported so that when the ball is moved to the unsupported portion of the sleeve, fluid is free to escape around the ball and to the piston-cylinder structure.

When the ball is at one extent of its travel in the sleeve, it seats against the shoulder of the bore to close the associated inlet passageway. At the other extent of its travel, the ball engages a seat surrounding the outlet passageway and blocks outflow of pressurized lubricant through this outlet passageway.

The annular ends of the sleeve are exposed to the pressurized lubricant to assure a tight seal between the ball and sleeve. It is believed that the fluid pressure acting on these annular end surfaces axially compresses the sleeve to enhance the sealing effect between the ball and sleeve.

The piston-cylinder structure is defined by a cylindrical bore which rigidly supports a plastic sleeve. A piston member or element, defined by a ball having an interference fit with the plastic sleeve, is movable back and forth in the sleeve in response to fluid pressure applied to the ball bearing. The interference fit between the ball and sleeve is such that the sleeve is resiliently deformed by the ball thus eliminating leakage of pressurized fluid around the ball.

The use of plastic sleeves and balls of the character described eliminates the necessity of polishing bores or movable members in the fluid handling device. Since balls for ball bearings are relatively inexpensively purchasable with a high degree of surface finish and in precise sizes, machining and finishing costs are avoided. Wearing of the plastic sleeves is minimized by the smooth bearing surface and is further reduced due to the fact that the moving ball bearing only momentarily frictionally engages a given location on the interior of the sleeve. Furthermore, the sleeves are supportable in relatively rough bores.

The plastic sleeves are preferably constructed from a vinyl plastic material and are translucent. Hence the position of a ball in a plastic sleeve can be observed through the sleeve. In one preferred construction, a transparent glass or plastic tube surrounds and rigidly supports the cylinder sleeve. A viewing slot in the housing permits ready visual determination of the position of the piston element without the necessity of providing a position indicating stem extending through the housing.

Another form of the invention utilizes balls which are attached to define a spool valve member disposed in a rigidly supported plastic sleeve. The balls are connected by, for example, a weldment at their engaged peripheries and the valve member is readily movable in the sleeve in response to unbalanced fluid pressure acting upon it. When the spool valve member moves over a port, the balls seal on opposite sides of the port so that flow through the port is prevented. Leakage of high pressure fluid from the space between the balls is prevented by the provision of annular end surfaces of the surrounding sleeve exposed to the pressurized fluid between the balls. The fluid pressure exerted on the annular ends of the sleeves increases the sealing effect between each ball and its associated sleeve.

One object of the present invention is the provision of a new and improved valve or piston-cylinder structure utilizing a rigidly supported resiliently deformable plastic sleeve and a ball similar to that used in a ball bearing having an interference fit with the sleeve whereby polishing of surfaces of the valve or piston-cylinder structures is obviated and a reliable, inexpensive, and long-lived fluid handling device is provided.

Another object of the present invention is the provision of a new and improved lubricant metering assembly employing valves and a piston-cylinder structure defined by plastic sleeves and ball elements supported in the plastic sleeves and which dispenses metered quantities of lubricant to a lubricated device, is reliable and long-lived and yet which is extremely inexpensively produced and maintained.

Other objects and advantages of the present invention will become apparent from the following detailed description thereof made with reference to the accompanying drawings which form a part of the specification.

DESCRIPTION OF PREFERRED EMBODIMENTS

Figure 1:
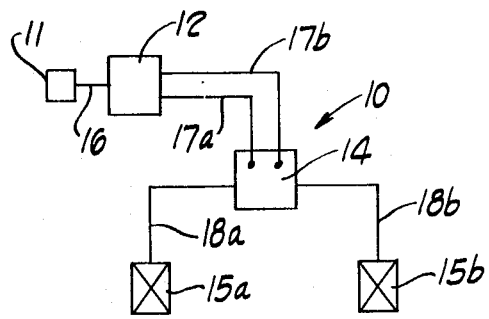
FIG. 1 is a schematic illustration of a lubrication system embodying the present invention.

FIG. 1 illustrates a lubrication system 10 embodying the present invention. The system 10 includes a lubricant reservoir 11, a lubricant pump 12, a lubricant metering assembly 14 which receives lubricant from the pump 12 and directs the lubricant in metered quantities to lubricated devices 15a, 15b. The reservoir 11 and pump 12 communicate with each other through a suitable conduit 16. The pump 12 is of conventional construction and provides a flow of pressurized lubricant alternately through conduits 17a, 17b to the metering assembly 14. The metering assembly directs metered flows of the lubricant to the lubricated devices 15a, 15b, alternately, through conduits 18a, 18b. Lubricant may be returned from the devices 15a, 15b to the reservoir 11 through conduits which are not shown.

The pump 12 is of conventional construction and accordingly is not illustrated or described in detail except to state that the pump may be timer operated and is constructed to provide pressurized flows of lubricant to the metering assembly 14 alternately through the conduits 17a, 17b.

Figure 2:
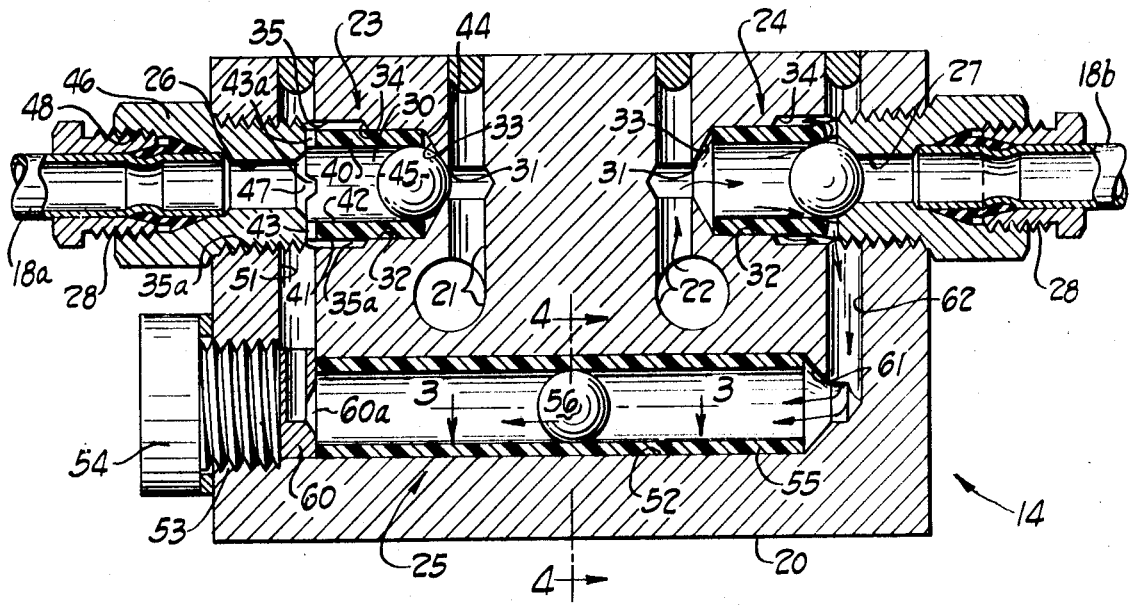
FIG. 2 is a cross-sectional view of a lubricant metering assembly forming a part of the system of FIG. 1.

Referring now to FIG. 2 the metering assembly 14 includes a housing 20 which defines inlet passageways 21, 22 communicating with the conduits 17a, 17b, respectively. Valve structures 23, 24 are disposed in the housing 20 and communicate with the inlet passageways 21, 22, respectively. A piston-cylinder structure 25 is also located in the housing 20 and communicates with outlet passageways 26, 27 in the housing 20 which communicate with the conduits 18a, 18b. Pressure fittings 28 are utilized to connect the conduits 18a, 18b to the housing 20.

The housing 20 is preferably a steel block which is machined to provide the various passageways and chambers which are referred to.

The valve structures 23, 24 are identical in construction and mode of operation and accordingly only the valve 23 is described in detail. The valve 23 is effective to admit lubricant from the pump 12 through the conduit 17a and inlet passageway 21 to the piston-cylinder structure 25. As inlet lubricant is admitted to the piston-cylinder structure through the valve 23, the outlet passageway 26 leading to the lubricated device 15a is blocked by the valve. Thus the pressure force of the pumped lubricant is transmitted to a piston member in the piston-cylinder structure causing movement of the piston and a flow of lubricant to the device 15b through the outlet passageway 27 as is described in more detail presently.

Lubricant flows to the lubricated device 15a from the piston-cylinder structure 25 through the outlet passageway 26. When the lubricant flows to the device 15a the valve 23 blocks the flow of pressurized lubricant into the inlet passageway 21.

The valve structure 23 includes a valve chamber 30 defined in the housing 20 and this chamber communicates with the inlet passageway 21 by way of a circular opening or port 31. The chamber 30 is defined by a cylindrical bore 32 adjacent the opening 31 and a frustoconical shoulder 33 extending between the bore 32 and the opening 31. The opposite end of the bore 32 is defined by a shoulder 34 and an enlarged cylindrical opening 35 extending through the sidewall of the housing 20 and surrounding the outlet passageway 26.

A sleeve 40 of plastic material is disposed in the chamber 30. The sleeve 40 includes a cylindrical outer surface 41, a cylindrical inner surface 42, and end surfaces 43, 44. The outer surface 41 tightly engages the bore 32 along a portion of its length while the remainder of the outer surface extends concentrically with, and spaced from, the opening 35. A relieved area of volume 35a is thus defined between the sleeve and the opening 35 and the sleeve is unsupported in this volume. The remainder of the sleeve 40 is rigidly supported by the bore 32. A press fit of about 0.008 to 0.016 inch has been provided between the sleeve 40 and bore 32 to insure adequate tightness.

A movable valve member 45 in the form of a ball is disposed in the sleeve 40. The ball 45 is similar to a ball used in a conventional ball bearing, the ball 45 is of a commercially available type and has a diameter which is from four to eight thousandths of an inch larger than the inner diameter of the sleeve 40 (when in a relaxed condition) so that an interference fit exists between the sleeve 40 and the ball 45.

When the ball 45 is located within the bore 32 the plastic material of the sleeve 40 is resiliently compressed by the ball bearing due to the rigid support afforded by the bore 32. This compression results in an extremely tight fluid seal about the periphery of the ball. Due to the smooth surface of the ball and the relatively low coefficient of friction of the plastic material forming the sleeve 40, the ball is movable axially within the sleeve in response to differential pressure across the ball while maintaining a tight seal.

The plastic material forming the sleeve must be capable of resilient compression through a large number of cycles and must also resist taking a permanent set should the ball 45 remain stationary over an extended period, for example when the assembly 14 is not in use. Polyvinylchloride tubes have performed satisfactorily in this capacity, however it has been found that a vinyl material, known commercially as "Tygon," manufactured by U.S. Stoneware, Inc. has been found best suited for resisting permanent set caused by stationary valve balls.

The valve structure 23 further includes a tubular valve seat member 46 which is threaded in a tapped section 35a of the opening 35 at the sidewall of the housing 20. The valve seat member 46 defines a generally frustoconical seat 47 which surrounds the outlet passageway 26. The axis of the seat 47 lies on the axis of the tube 40 so that the ball 45 is aligned with the seat. The valve seat member 46 also defines an outer end opening 48 in which the pressure fitting 28 is supported for firmly fixing the conduit 18a to the housing 20 in a fluid tight relationship.

The valve structure 23 is operated in response to differential fluid pressure acting upon the ball 45. When the pump 12 directs lubricant to the passageway 21, the ball 45 is moved towards the seat 47. As the ball moves into the unsupported portion of the sleeve 40 the pressure deflects the sleeve away from the periphery of the ball permitting the pumped lubricant to escape from the tube 40 about the ball (see the valve structure 24). The pressure of the lubricant acting upon the ball firmly seats the ball against the seat 47 to prevent escape of lubricant around the ball and through the outlet passageway 26. The lubricant pumped into the valve structure 23 is thus directed to the piston-cylinder structure through a passage 51 defined by a drilled hole extending through the valve chamber and to the piston-cylinder structure.

In order to minimize the possibility of shifting of the tube 40 along the bore 32 as inlet fluid pressure is exerted on its end 44, the end 43 of the tube engages or is closely adjacent the valve seat member 46 which thus provides a stop for the sleeve. In the illustrated embodiment notches 43a are provided in the end surface 43 to facilitate communication between the interior and exterior of the sleeve at the end of the sleeve.

When lubricant is to be exhausted to the lubricated device 15a through the outlet passageway 26, high pressure lubricant is directed from the piston-cylinder structure 25 and into the region surrounding the ball 45 and the seat 47. This high pressure lubricant acts upon the sleeve 40 and the ball 45 so as to seal the unsupported portion of the sleeve against the ball and to urge the ball toward the inlet passageway 21. The lubricant pressure in the inlet passageway 21 is relieved and thus the ball 45 freely moves into engagement with the shoulder 33, blocking the inlet passageway 21. The high pressure lubricant is communicated to the lubricated device 15a through the outlet passageway 26.

Figure 4:
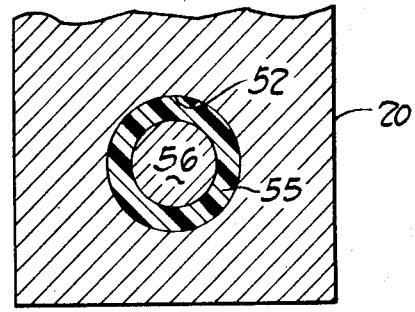
FIG. 4 is a cross-sectional view as seen from the plane indicated by the line 4—4 of FIG. 2.
Figure 3:
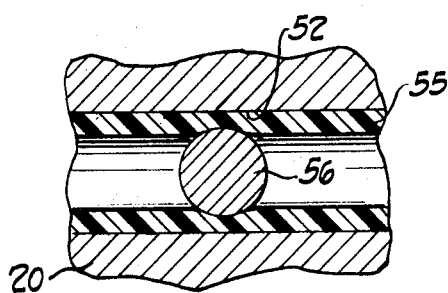
FIG. 3 is a cross-sectional view seen from the plane indicated by the line 3—3 of FIG. 2.

The piston-cylinder structure 25 is shown in FIGS. 2–4 and is defined by a cylindrical bore 52 in the housing 20. The bore 52 defines a tapped end opening 53 which receives a threaded plug 54 for closing the bore.

A cylindrical polyvinylchloride, or "Tygon," sleeve 55 is rigidly supported by the bore 52. The rigid support of the sleeve is insured by a press fit between the bore and sleeve as described previously in reference to the valve structures. A piston member 56 in the form of a ball is disposed in the sleeve 55. The ball is the same as or similar to balls used in bearings and has a diameter which is from four to eight thousandths of an inch greater than the inside diameter of the sleeve 55. Thus the sleeve material is resiliently compressed between the periphery of the ball and the bore 52. FIG. 3 illustrates the relationships between the ball 56, sleeve 55 and bore 52 with the compression of the sleeve somewhat exaggerated for the purpose of illustration. The ball 56 freely moves back and forth in the sleeve 55 in response to differential fluid pressures on the ball. The seal between the sleeve and ball bearing prohibits leakage of fluid past the ball even at extremely high pressures. It has been found that exposing the annular ends of the sleeve 55 to the fluid on either side of the ball enables the seal between the ball periphery and the sleeve to withstand greater pressure differentials without leakage than when the sleeve ends are not exposed to the pressure. This is believed to result from fluid pressure acting on an annular end surface to compress the sleeve axially somewhat between the annular end and the ball.

The drilled hole 51 opens into the bore 52 at the end of the sleeve 55 through a valve seat construction 60 formed by the plug 54. The seat construction 60 includes a frustoconical surface 60a against which the ball seats thereby defining a second seal against leakage of the lubricant past the ball 56 and into the drilled hole 51. The valve seat also serves as a stop to prevent the ball 56 from moving beyond the end of the sleeve.

The opposite end of the sleeve 55 is disposed adjacent a chamfered end 61 of the bore 52. A passage 62 defined by a drilled hole, like the hole 51, extends into the bore through the chamfered end 61 for communicating the valve structure 24 and the piston-cylinder structure. The passage 62 is located so that the ball 56 engages the chamfered end of the bore 52 thus blocking the passage 62 while being maintained in compressive relationship with the sleeve 55.

OPERATION OF THE METERING ASSEMBLY 14

When the metering assembly is in its condition illustrated in FIG. 2, lubricant is supplied to the inlet passageway 22, through the valve structure 24, passage 62 and to the piston-cylinder structure 25. Lubricant pressure urges the piston member or ball 56 toward the left as seen in FIG. 2.

The ball 45 of the valve structure 24 closes the outlet passage 27 under the influence of the pumped lubricant. The pumped lubricant thus flows between the ball 45 and sleeve 40 of the valve structure 24 to move the piston member as noted.

Lubricant on the opposite side of the piston ball 56 is urged from the sleeve 55 through the passage 51 and to the lubricated device 15a through the outlet passageway 26. The ball 45 of the valve structure 23 moves to the right as seen in the FIG. and closes the inlet passage 21. Movement of this ball uncovers the outlet passageway 26 so that lubricant flowing in the passage 51 is free to flow to the lubricated device 15a as the piston member 56 moves through its stroke.

On the next half cycle of operation of the pump 12 high pressure lubricant is introduced into the inlet passageway 21 moving the ball 45 of the valve structure 23 into engagement with the seat 47 to block the outlet passage 26. The inlet lubricant flows between the ball 45 and sleeve 40 of the valve structure 23, through the passage 51, and forces the piston 56 to the right.

The lubricant on the opposite side of the piston member exerts pressure on the ball 45 of the valve structure 24 causing the ball to move to the left as seen in FIG. 2 to block the inlet passageway 22. The lubricant adjacent the valve structure 24 thus flows through the outlet passageway 27 to the lubricated device 15b.

When the piston 56 reaches the right hand end of the bore 52, lubricant is no longer supplied to the lubricated device 15b and the pump 12 terminates operation.

A single ball is illustrated in the piston-cylinder structure 25; however it should be noted that the piston element may be constructed from a plurality of balls if desired. Since metering the proper amount of lubricant is essential, it is apparent that the number of balls utilized to construct the piston element controls the displacement volume of the piston cylinder structure and therefore controls the amount of lubricant dispensed. Since balls of the type used are quite inexpensive, this manner of controlling the lubricant flow does not materially affect manufacturing cost.

Figure 4A:
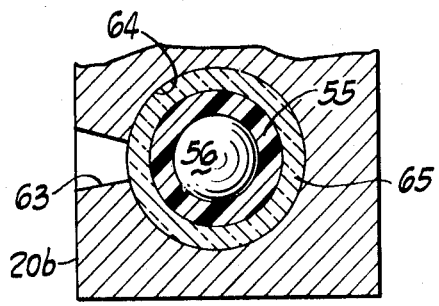
FIG. 4A is a view similar to FIG. 4 showing a modification of the construction of FIG. 4.

FIG. 4A shows the assembly 14 modified to enable visual monitoring of operation of the piston. As seen in FIG. 4A the housing 20 is provided with a slot 63 which extends from a sidewall 20b of the housing to a cylinder bore 64. The bore 64 is of larger diameter than the bore 52 but is otherwise the same. A glass or plastic tube 65 is supported in the bore 64. The sleeve 55 and ball 56 are press fitted into the tube so that the tube firmly supports the periphery of the sleeve 55. The sleeve 55 and the tube are transparent or translucent and hence the piston of the piston 56 is readily visible through the viewing slot 63 and the need for indicator stems or similar structures extending from the piston-cylinder structure through the sidewall of the housing is obviated.

Figure 5:
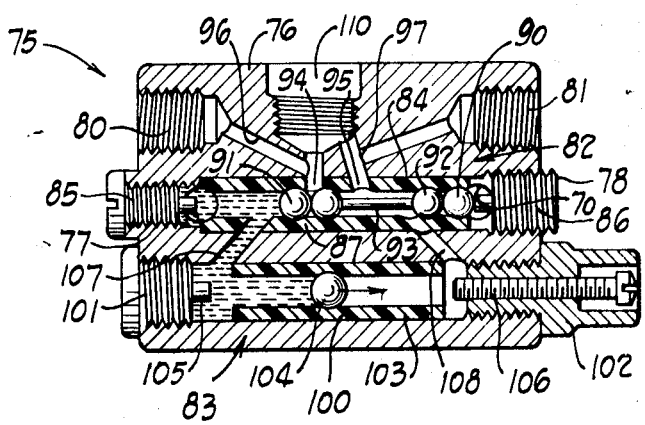
FIGS. 5 and 6 are cross-sectional views of another lubricant metering assembly embodying the present invention with parts thereof shown in different operating positions; and, FIGS. 7 and 8 are cross-sectional views of still another lubricant metering assembly embodying the present invention with portions shown schematically and with parts shown in different operating positions.
Figure 6:
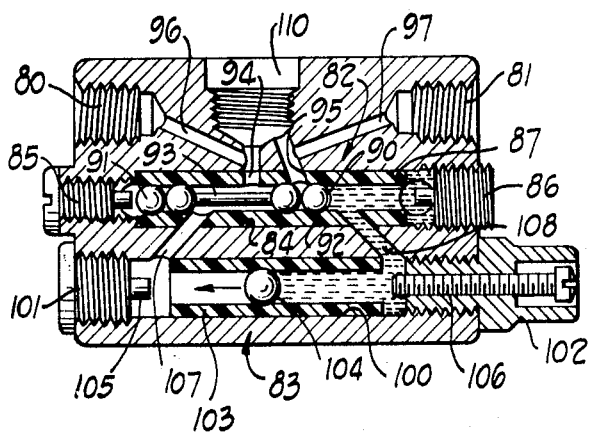

Referring now to FIGS. 5 and 6, a modified metering assembly 75 is shown. The assembly 75 includes a housing 76 defining lubricant inlet passageways 77, 78 communicating with a pump (not shown) such as the pump 12 of FIG. 1. The housing 76 defines outlet passageways 80, 81 from which lubricant is directed to lubricated devices, such as the devices 15a, 15b of FIG. 1, in metered quantities and at intervals determined by the frequency of cycling of the pump.

A valve structure 32 and piston-cylinder structure 83 are disposed in the housing. The valve structure is effective to communicate inlet lubricant from the pump to the piston-cylinder structure which is operated by the inlet lubricant to force a metered quantity of outlet lubricant through the valve structure 82 and to a lubricated device. During the next half cycle of pump operation the valve structure and piston-cylinder structure are operated to direct a metered quantity of lubricant to the other lubricated device in reverse manner.

The valve structure 82 is defined by a bore 84 extending through the body and intersecting the inlet passageways 77, 78. The ends of the bore are closed by suitable threaded plugs 85, 86.

A sleeve 87 of plastic material, such as "Tygon," is press fitted into the bore 84, an 0.008 to 0.016 inch press fit being preferred. The open ends of the sleeve are notched to provide free communication of inlet lubricant to the central part of the sleeve through the inlet passageways.

A valve member 90 is disposed in the sleeve 87 for reciprocal movement in response to unbalanced lubricant pressure acting upon it. The valve member 90 includes pairs of balls 91, 92, of the character referred to previously, which are rigidly connected together by a connecting pin 93. The balls of each pair are spot welded together and the pin 93 is welded to each pair at its ends.

The balls of each pair 91, 92 define a spoollike structure for covering ports 94, 95 communicating the interior of the sleeve with the outlet passageways 80, 81 through outlet flow passages 96, 97.

The piston-cylinder structure 83 is defined by a bore 100 extending through the body 76 parallel to the bore 84. The open ends of the bore 100 are threaded to receive plugs 101, 102. A plastic sleeve 103 is snugly received in the bore 100 and a ball 104 is pressed into the sleeve to provide the piston. The relationships between the sleeve dimensions, the bore and the ball are the same as referred to previously.

The extent of travel of the piston 104 in the sleeve 103 is controlled by stops 105, 106 carried by the plugs 101, 102, respectively. The stop 106 is in the form of a screw which is threaded through the plug 102. This stop can be adjustably moved axially of the sleeve to thereby adjust the piston travel.

The piston-cylinder structure communicates with the valve structure via flow passageways 107, 108. These passageways open into opposite ends of the bore 100 and extend toward the central portion of the valve structure 84.

When pumped lubricant flows into the valve structure 82 through the inlet passageway 77 the valve member 90 moves toward the plug 86 (FIG. 5) in response to the inlet fluid pressure. The ball pair 91 uncovers the passageway 107 admitting pumped lubricant to the piston-cylinder structure. This lubricant forces the ball 104 towards the stop 106 causing the lubricant in the low pressure side of the piston-cylinder structure to flow to the lubricated device through the passageway 108, around the connecting rod 93 in the valve structure through the outlet flow passage 97 and the outlet passageway 81. When the ball 104 engages the stop 106 the flow outlet lubricant ceases.

The valve member 90 quickly moves to its limit position against the plug 86. In this position the ball pair 91 covers the port 94 of the outlet flow passage 96. The ball pair 92 prevents outlet lubricant flow from entering the inlet passageway 78.

When lubricant is pumped into the inlet passageway 78 the operation of the assembly 75 is reversed (FIG. 6). The valve member moves to the plug 85 causing inlet lubricant to flow to the piston-cylinder structure through the passageway 108. The ball 104 moves toward the stop 105 forcing lubricant ahead of the ball to a lubricated device through the passageway 107, the valve, the outlet passage 96 and the outlet passageway 80. The ball pair 92 blocks the port 95 while the ball pair 91 prevents outlet lubricant flow to the inlet passageway 77.

The ports 94, 95 in the valve structure may be formed by drilled holes extending to the bore 84 from a suitable cavity in the housing. This cavity is closed by a conventional threaded plug 110 after the ports are formed.

Figure 7:
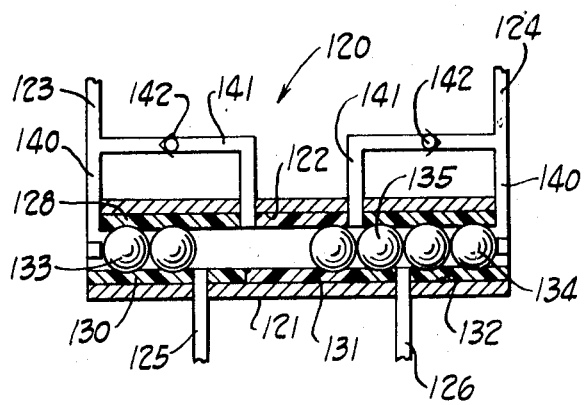
Figure 8:
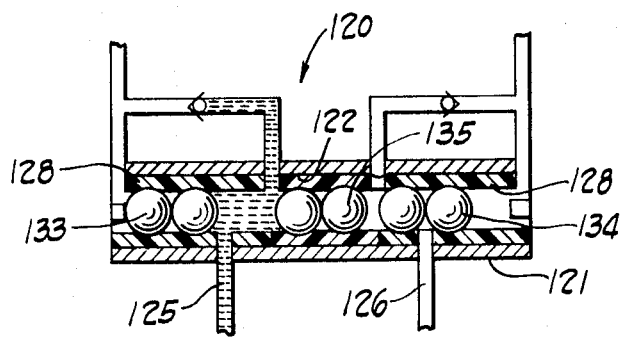

FIGS. 7 and 8 illustrate another metering assembly 120 embodying the invention. The assembly 120 is shown schematically in part and includes a body 121 defining a cylindrical bore 122. The ends of the bore are closed and inlet passageways 123, 124 communicate with the bore 122 at locations near its ends. A pair of outlet passageways 125, 126 extend from the bore to lubricated devices (not shown).

The bore 122 defines a valve structure and a piston-cylinder structure. The bore snugly supports a sleeve 128 formed by three separate plastic tubes 130–132 placed end to end between the ends of the bore. Two movable spool valve members 133, 134 are disposed in the sleeve 128 and movable piston member 135 is supported in the sleeve between the spool valve members.

The spool valve members and the piston are identical in construction and each consists of a pair of balls spot welded together. The valve members and piston are sized to resiliently compress the sleeve as is described previously.

The inlet passageways are identical and only the passageway 124 is described. Corresponding parts are shown by like reference characters. The inlet passageway 124 includes parallel branches 140, 141 leading into the assembly. The branch 140 opens into the extreme end of the bore while the branch 141 opens into the bore a predetermined axial distance from the branch 140. The branch 141 includes a suitable check valve 142 preventing flow from the bore into the line 124.

The outlet passageways 125, 126 open into the bore between the branches 140, 141 of the inlet passageways 123, 124, respectively. The center lines of the outlet passageways are spaced from the center lines of the branches 140 a distance corresponding to the diameter of the ball of the valve members and piston member.

When pumped lubricant is initially directed through the inlet passageway 124 the valve members and piston members are in the positions illustrated in FIG. 7. Inlet lubricant pressure is directed to the branches 140, 141 and the valve member 134 and piston member 135 are moved as a unit toward the outlet passageway 125.

The piston member 135 uncovers the branch 141 just as the valve member 134 covers the outlet passageway 126. At this juncture the fluid pressure acting on the valve member 134 is substantially balanced and the valve member stops in position over the outlet 126.

The piston member continues moving toward the valve member 133 causing lubricant in front of the piston to flow from the outlet 125. The check valve 142 in the inlet 123 prevents flow through the branch 141 while the valve member 133 prevents flow through the branch 140.

When the piston member engages the valve member 133, the outlet passageway 125 is blocked by the piston itself and lubricant flow through the passageway 125 ceases.

When lubricant is pumped through the passageway 123 the operation of the assembly is reversed and lubricant flows out of the assembly through the passageway 126.

The tubes 130–132 have annular ends which abut at the inlet branches 141. It has been found that by permitting the annular ends of these tubes to be exposed to the fluid pressure acting between the balls of the piston member, a tendency toward leakage of the lubricant past the balls of the piston is eliminated. This is believed due to the fact that the fluid pressure compresses the tube material and effects a tighter seal with the balls of the piston.

Although preferred embodiments of the invention have been described with a certain degree of particularity, it is understood that the present disclosure of these preferred forms has been made only by way of example and that numerous changes in details of construction and arrangement of parts may be resorted to without departing from the scope of the invention. For example, a piston-cylinder construction of the character described could be utilized to perform control functions such as operating an electrical switch or the like in response to a predetermined fluid pressure acting on the piston.

What is claimed is:

1. In a lubrication system including a lubricant pump for directing lubricant to a lubricated device, a lubricant metering assembly comprising:
    a. a body defining inlet and outlet passageways;
    b. valve structure communicating with said inlet and outlet passageways and including a movable valve member for controlling flow of lubricant in said assembly;
    c. piston-cylinder structure communicating with said valve structure including a piston member reciprocally movable in a cylinder to direct lubricant to a lubricated device; and
    d. at least one of said valve and said piston-cylinder structures defined by a sleeve of plastic material rigidly supported about at least a part of its periphery and at least a ball in said sleeve having a diameter which is larger than the internal diameter of said sleeve when said sleeve is in a relaxed condition.

2. A system as claimed in claim 1 wherein said valve structure includes a valve having a cylindrical bore defined by said housing, a plastic sleeve supported in said bore, an inlet passageway at one end of said sleeve, an outlet passageway at the other end of said sleeve, and a passage communicating said valve with said piston-cylinder structure, and at least one ball movable in said sleeve in response to fluid pressure applied thereto, said ball resiliently compressing said sleeve against said bore to positively seal flow about said ball.

3. A system as claimed in claim 2 wherein a part of said sleeve extends unsupported from said bore, said ball noncompressively engaging said part of said sleeve whereby lubricant flows under pressure between said ball and said sleeve.

4. A system as claimed in claim 3 wherein said unsupported part of said sleeve is an end of said sleeve, said outlet passageway defined adjacent said end and valve seat surrounding said outlet passageway, said ball engaging said seat and covering said outlet passageway when lubricant flows past said ball, said lubricant flowing to said piston-cylinder through said passage.

5. A system as claimed in claim 4 wherein lubricant flowing to said piston-cylinder structure moves said piston to effect lubricant flow to a lubricated device through a second outlet passageway.

6. A system as claimed in claim 4 wherein high pressure lubricant communicated to said valve through said passage forces said ball through the supported portion of said sleeve to block said inlet passageway and open said outlet passageway for lubricating a device communicating with said outlet passageway.

7. A system as claimed in claim 1 wherein said piston and cylinder structure is defined by a bore in said housing, and a rigid transparent tube supported in said bore, said plastic sleeve rigidly supported by said tube and said piston member defined by said ball, and said housing defining an opening through which the location of said piston member in said sleeve is visible from outside the housing.

8. A system as claimed in claim 1 wherein said valve member is a spool valve member defined by balls and connecting structure between adjacent balls for defining an annular space therebetween, said balls movable in said sleeve to a position at which a fluid port in said sleeve communicates with an annular space between adjacent balls whereby flow through said port is prevented.

9. A system as claimed in claim 1 wherein said piston member is defined by a pair of balls rigidly connected at their peripheries and defining an annular space therebetween.

10. In a fluid handling device:
    a. a rigid housing defining a tubular chamber having at least a fluid port;
    b. a resiliently deformable sleeve having an outer periphery which is rigidly supported in said chamber;
    c. a movable member in said sleeve comprising at least a ball having a diameter which is larger than the internal diameter of said sleeve in a relaxed condition; and,
    d. said ball resiliently compressing said sleeve between the chamber wall and the periphery of said ball to form a fluid seal between said ball and said sleeve.

11. A device as claimed in claim 10 wherein said sleeve is press fitted into said chamber.

12. A device as claimed in claim 10 wherein said sleeve is unsupported by said chamber adjacent an end, and wherein pressurized fluid flows between said ball and said sleeve in one direction when said ball is disposed in said unsupported portion of said sleeve.

13. A device as claimed in claim 10 wherein said sleeve is formed from a plastic vinyl material.

14. A device as claimed in claim 10 wherein said movable member is defined by first and second balls rigidly connected together to define a sealed space therebetween and operable to close said port against fluid flow therethrough when said balls are positioned to communicate said port with said sealed space.

15. A lubricant metering assembly comprising:
    a. a housing having an inlet port and an outlet port;
    b. a chamber in said housing;
    c. a metering piston slidably disposed in said chamber;
    d. valve means for governing the flow of lubricant into said chamber whereby said piston is exposed to high pressure lubricant and moves in said chamber to force a metered quantity of lubricant from said housing to a lubricated device through said outlet port;
    e. said chamber having a wall defined by a sleeve of resiliently deformable material having its outer periphery rigidly supported by said housing; and,
    f. said piston comprising a rigid member disposed in said sleeve, said rigid member having a larger diametrical extent than the internal diametrical extent of said sleeve with said sleeve compressed between said housing and the periphery of said piston so that leakage of lubricant under pressure therebetween is prevented.

16. The metering assembly claimed in claim 15 wherein said piston is a rigid ball and said sleeve defines a cylindrical internal periphery.

17. A valve comprising:
   a. a valve housing defining a valve chamber;
   b. a first port opening into a first chamber portion;
   c. a second port opening into a second chamber portion remote from said first port;
   d. a third port opening into said chamber adjacent said second port; and,
   e. valving members cooperating with said ports to enable fluid flow from said first port through said third port while blocking said second port and for enabling flow from one of said second and third ports through the other of said second and third ports while blocking said first port, said valving members comprising:
      1. a sleeve of resiliently compressible material having a first peripheral portion adjacent said first port, said sleeve having an outer periphery which is rigidly supported by said first chamber portion, said sleeve projecting towards said second and third ports and into said second chamber portion;
      2. a rigid valve member disposed in said sleeve for movement between said first port and one of said second and third ports; and
      3. said rigid valve member having a cross-sectional shape which is the same as the internal cross-sectional shape of said sleeve and having a larger diametrical extent than the diametrical extent of the internal periphery of said sleeve whereby said rigid valve member compresses said sleeve against the wall of said first chamber portion when said valve member is in said first chamber portion to form a seal against leakage between said rigid valve member and said sleeve.

18. The valve of claim 17 wherein the outer periphery of said sleeve is radially expandable in said second chamber portion whereby fluid passes between said rigid member and the internal periphery of said sleeve from said first port to one of said second and third ports when said valve member blocks the other of said second and third ports.

19. A lubricant metering assembly comprising:
   a. a body defining inlet and outlet passageways;
   b. valve means for controlling flow of lubricant in said assembly;
   c. lubricant metering means communicating with said valve means and comprising a metering piston member in a housing chamber, said piston member reciprocally movable in the chamber to force a metered quantity of lubricant from the chamber and out of an outlet passageway in response to lubricant flowing from an inlet passageway into said chamber via said valve means;
   d. said chamber defined by a sleeve of resiliently deformable material having an outer periphery rigidly supported by said body and an inner periphery having a cross-sectional shape which is the same as the cross-sectional shape of said piston member and of smaller size than the size of said piston member whereby said piston tightly engages said sleeve and resiliently compresses said sleeve to prevent leakage of lubricant around said piston.

20. The assembly claimed in claim 19 wherein said body defines first and second inlet passageways and first and second outlet passageways, said valve means comprising a first valve communicating said first inlet passageway with said chamber and for enabling communication between said chamber and said first outlet passageway, a second valve for communicating said second inlet passageway with said chamber and for enabling communication between said chamber and said second outlet passageway, said first valve blocking said first outlet passageway and communicating said first inlet passageway to said chamber when lubricant flows through said first inlet passageway, said lubricant creating a pressure force on said piston member to move said piston member and force lubricant from said chamber through said second outlet passageway, said second valve blocking said second outlet passageway and communicating said second inlet passageway to said chamber when lubricant flows through said second inlet passageway, lubricant flowing through said second inlet passageway creating a pressure force on said piston to move said piston and direct a metered quantity of lubricant from said chamber through said first outlet passageway.

21. A fluid handling device comprising:
   a. a rigid housing defining a tubular chamber having at least a fluid port;
   b. a resiliently deformable sleeve in said chamber having at least part of its outer periphery rigidly supported by the chamber;
   c. a movable member in said sleeve, said member having a cross-sectional shape which is the same as the cross-sectional shape of the inner periphery of said sleeve and a diametrical extent which is greater than the diametrical extent of the inner periphery;
   d. said member resiliently compressing said sleeve against said chamber to form a fluid seal about said member.